United States Patent
Rahamathjan et al.

(10) Patent No.: US 11,849,085 B2
(45) Date of Patent: Dec. 19, 2023

(54) METHODS AND SYSTEMS FOR AUTOMATICALLY TRANSFERRING SCANNED DOCUMENTS FROM MULTI-FUNCTION DEVICES TO PERSONAL DEVICES

(71) Applicant: XEROX CORPORATION, Norwalk, CT (US)

(72) Inventors: Suhail Sheriff Rahamathjan, Chennai (IN); Syed Samiullah, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/117,778

(22) Filed: Dec. 10, 2020

(65) Prior Publication Data

US 2022/0191336 A1    Jun. 16, 2022

(51) Int. Cl.
*H04N 1/00* (2006.01)
*H04N 1/327* (2006.01)
*H04N 1/32* (2006.01)

(52) U.S. Cl.
CPC ..... *H04N 1/00307* (2013.01); *H04N 1/00411* (2013.01); *H04N 1/32778* (2013.01); *H04N 1/32122* (2013.01); *H04N 2201/3249* (2013.01)

(58) Field of Classification Search
CPC .......... H04N 1/00307; H04N 1/32778; H04N 1/00411; H04N 1/32122; H04N 2201/3249
See application file for complete search history.

(56) References Cited

U.S. PATENT DOCUMENTS

| | | | |
|---|---|---|---|
| 7,970,817 B2* | 6/2011 | Hagiuda | G06Q 10/10 709/203 |
| 9,521,277 B1* | 12/2016 | Johnson | G06F 3/1238 |
| 9,565,175 B1* | 2/2017 | Saylor | H04L 67/06 |
| 2014/0002857 A1* | 1/2014 | Huang | H04N 1/00278 358/1.15 |
| 2014/0229550 A1* | 8/2014 | Tredoux | H04L 51/08 709/206 |
| 2014/0355063 A1* | 12/2014 | Jang | H04W 4/80 358/1.15 |
| 2016/0182762 A1* | 6/2016 | Eum | H04N 1/00307 358/1.14 |
| 2016/0224680 A1* | 8/2016 | Maynard, II | G06F 16/93 |
| 2017/0257517 A1* | 9/2017 | Panda | H04N 1/00244 |
| 2019/0149660 A1* | 5/2019 | Yasuoka | H04M 3/4211 379/266.1 |

* cited by examiner

*Primary Examiner* — Nicholas Pachol
(74) *Attorney, Agent, or Firm* — JONES ROBB, PLLC; Susanne Jones

(57) ABSTRACT

According to aspects illustrated herein, methods and systems for direct and automatically transferring a scanned document from a multi-function device to a personal device of the user, are disclosed. The method includes receiving a document for scanning. The received document is scanned to generate a scanned document. Upon completion of the scanning, a pre-defined code corresponding to the scanned document is generated. The pre-defined code is displayed to a user on a user interface of the multi-function device. Then, a request to scan the displayed pre-defined code is received via the personal device of the user. Upon successful scanning, the scanned document is automatically downloaded on the personal device of the user after appropriate authorization.

10 Claims, 4 Drawing Sheets

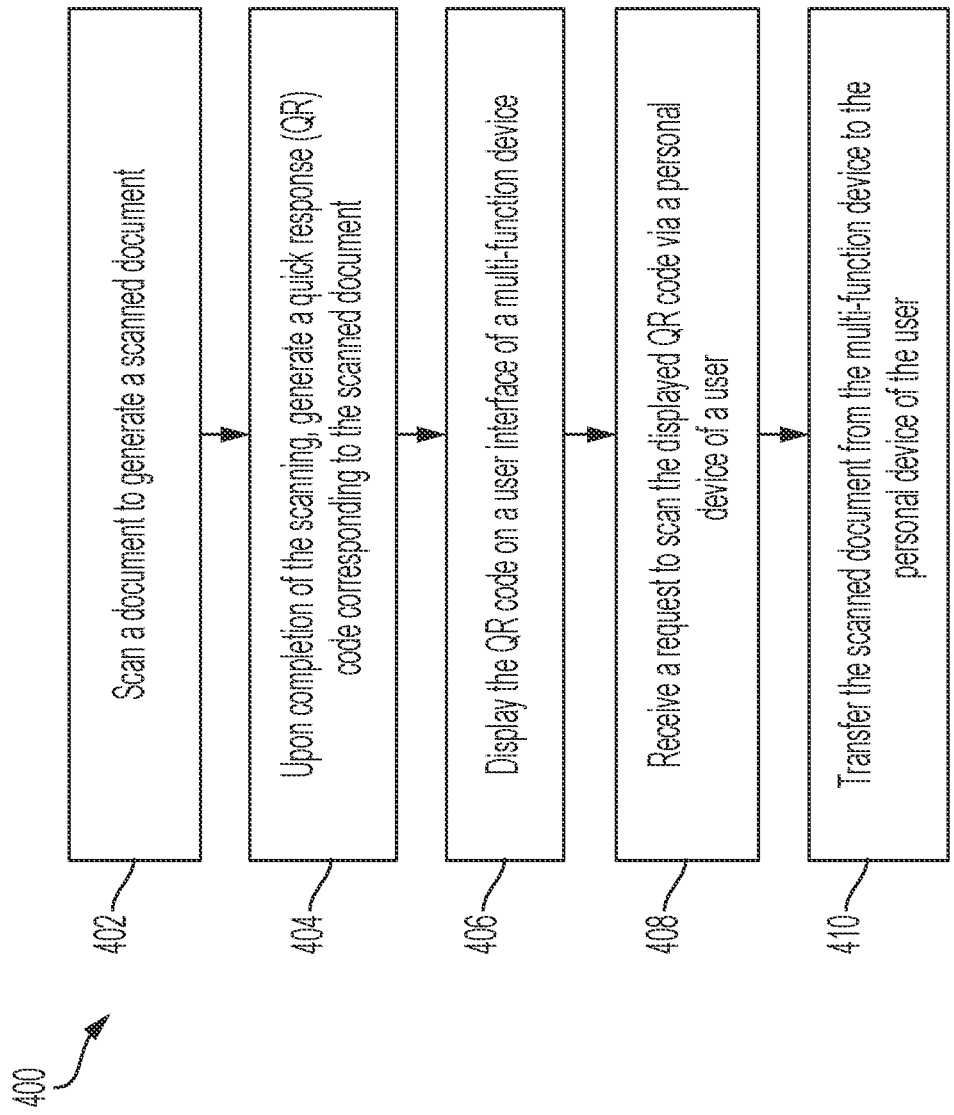

METHODS AND SYSTEMS FOR AUTOMATICALLY TRANSFERRING SCANNED DOCUMENTS FROM MULTI-FUNCTION DEVICES TO PERSONAL DEVICES

TECHNICAL FIELD

The presently disclosed subject matter relates to the field of scanning, and more particularly to methods and systems for automatically transferring a scanned document from a multi-function device to a personal device of a user.

BACKGROUND

Typically, when a document is scanned using a scanner, or a multi-function device, the scanned document is either shared via email, or can be stored in a local memory of the scanner or can also be downloaded directly in a portable storage device such as a pen drive etc. If the scanned document is sent via email, the user has to open his email using a separate device, for example, a computing device and then manually download the scanned document on his computing device. If the scanned document is stored in the local memory of the scanner, the user has to manually retrieve the scanned document by connecting the pen drive to the scanner or other ways. In all implementations, the user needs a separate device to manually transfer/download the scanned document on his device. Sometimes there is a requirement to fetch the scanned document in a personal device of the user such as a mobile device or a tablet. In such cases, the user can either email the scanned document or upload the scanned document to a local or a cloud server destination & then download it on his mobile device from those destinations. In other cases, the user transfers the scanned document to a pen drive and manually retrieves it from there. In more examples, the user has to manually connect the mobile/tablet device to the multi-function device using cables and then transfer the scanned document to his mobile/tablet device. In all existing solutions, there is always an intermediate destination (for example, computing device, USB, cables etc.) involved where the scanned output document is placed/sent first, which is then accessed by the user manually to download the scanned document on the mobile/tablet device. And this whole process is time consuming and tedious. Additionally, sometimes the scanned document is huge in size and thus, sending the scanned document via email may not be a feasible option. In this light, there is a need for improved methods and systems to address the above-mentioned problems.

SUMMARY

According to aspects illustrated herein, a method for direct and automatic transferring of a scanned document from a multi-function device to a personal device of a user, is disclosed. The method is implemented at the multi-function device. The method includes receiving a document for scanning from the user. The received document is scanned to generate a scanned document. Upon completion of the scanning, a pre-defined code such as a quick response (QR) code corresponding to the scanned document is generated. The pre-defined code is displayed on a user interface of the multi-function device. Then, a request to scan the displayed pre-defined code is received from the personal device of the user. Upon successful scanning of the pre-defined code, the scanned document is automatically transferred from the multi-function device to the personal device of the user without requiring any intermediate destination.

According to further aspects illustrated herein, a multi-function device for direct transferring a scanned document to a personal device of a user is disclosed. The multi-function device includes: a scanner for generating a scanned document corresponding to a document received for scanning; a code generator for generating a pre-defined code corresponding to the scanned document; a user interface for displaying the pre-defined code to the user; a controller for: receiving a request to scan the displayed pre-defined code via the personal device of the user; and upon successful scanning of the pre-defined code, automatically transferring the scanned document to the personal device of the user.

According to more aspects, a personal device for automatically downloading a scanned document from a multi-function device is disclosed. The personal device includes a camera to scan a pre-defined code displayed on a multi-function device, wherein the pre-defined code corresponds to a scanned document. Further, the personal device includes a controller to: read/decipher the pre-defined code; and automatically access a link given in the pre-defined code to download the scanned document on the personal device of the user.

According to further aspects illustrated herein, a system including a multi-function device and a personal device is disclosed. The multi-function device includes one or more components for: receiving a document for scanning from a user; scanning the received document to generate a scanned document; upon completion of the scanning, generating a pre-defined code corresponding to the scanned document; displaying the pre-defined code on a user interface of the multi-function device; receiving a request to scan the displayed pre-defined code via a personal device of the user; and upon successful scanning of the pre-defined code, automatically transferring the scanned document from the multi-function device to the personal device of the user. The personal device is communicatively coupled to the multi-function device using the pre-defined code, the personal device having one or more components for: sending the request to scan the pre-defined code displayed on the user interface of the multi-function device; and upon successful scanning of the pre-defined code, automatically downloading the scanned document on the personal device of the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 4 is a method flowchart for automatically and direct transferring a scanned document from a multi-function device to a personal device of a user.

DESCRIPTION

Figure 1:
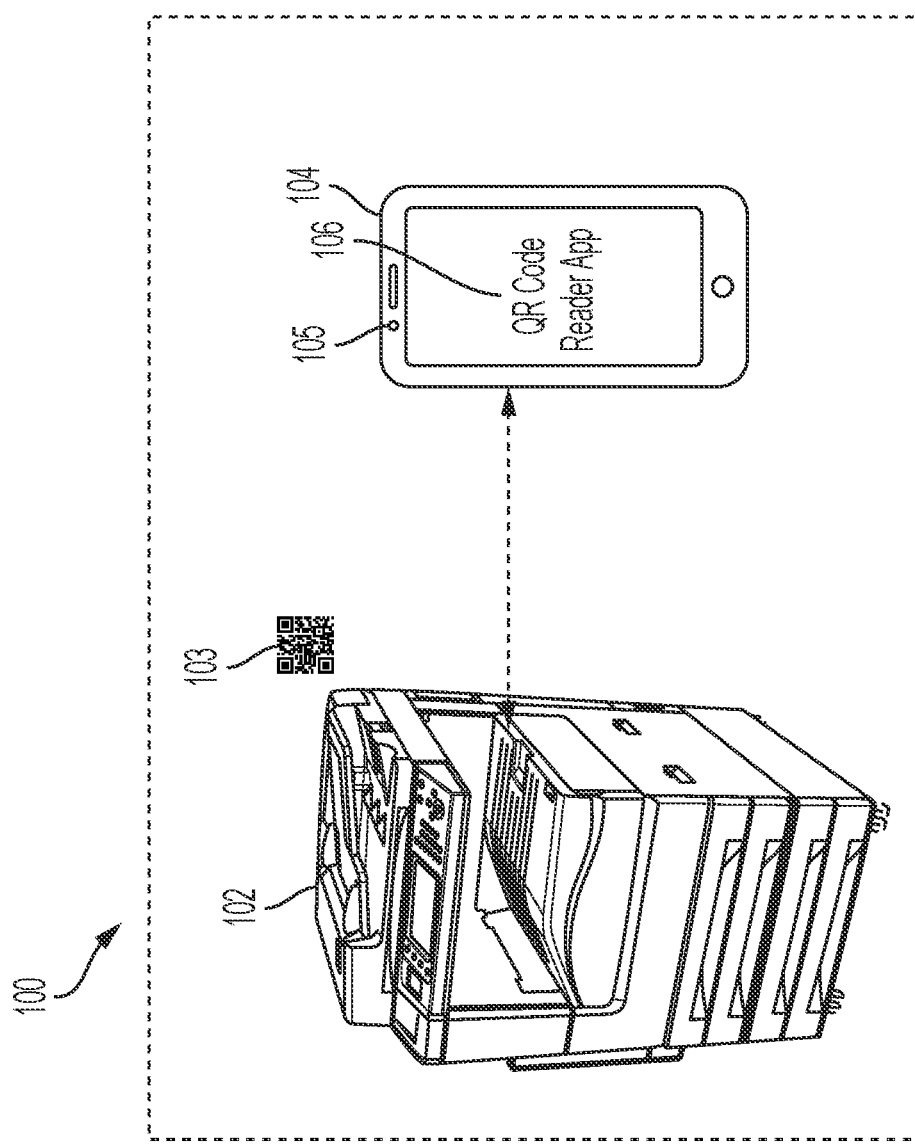
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The "multi-function device" is a single device or a combination of multiple devices, to perform one or more functions such as, but not limited to, printing, imaging, scanning, and so forth. The multi-function device may include software, hardware, firmware, or a combination thereof. The multi-function device scans a document to generate a scanned document. In context of the present disclosure, the multi-function device generates a pre-defined code (for example QR code) corresponding to the scanned document and uses the pre-defined code for pairing with a personal device of a user. Upon successful pairing, the multi-function device directly and automatically transfers the scanned document to the personal device of the user.

The term "personal device" refers to any device of the user where he wishes to download the scanned document from the multi-function device. The personal device of the user is considered to be registered with the multi-function device for downloading the scanned document on the personal device. Particularly, phone number of the user is registered with the multi-function device. In context of the present disclosure, the personal device scans the pre-defined code displayed on the multi-function device to automatically download the scanned document on the personal device of the user. Examples of the personal device include, but are not limited to, a mobile phone, a tablet, a Personal Digital Assistant (PDA), a smart-phone, or any other device capable of data communication. The personal device may be any device having a functionality to scan/read the pre-defined code.

The term "document" refers to a document submitted for scanning and the document is in a physical form such as printed on paper. The term "scanned document" refers to a scanned output generated after scanning, wherein the scanned document is in a virtual or software form (embodied in a software file). The virtual form can also be referred to as digital form, electronic version, or the like.

The "pre-defined code" can be any 2-dimensional code that includes information related to the scanned document. For example, the pre-defined code includes a link to a location such as a server where the scanned document is stored. The pre-defined code may be a QR code, a bar code, or any other codes as known or later developed, without limiting the scope of the disclosure.

The term "transferring" refers in context of transferring the scanned document from the multi-function device to the personal device of the user. The term "downloading" refers in context of the personal device of the user, when the personal device automatically downloads the scanned document from the multi-function device to the personal device, using the pre-defined code.

Overview

Typically, when a scanned document is generated, it is sent via an email, stored over a local server, a cloud server or stored in a portable storage device such as a USB. In all such scenarios, a user accesses a separate device (intermediate destination such as USB, cloud sever, computing device to access emails) and then manually downloads the scanned document from any of the intermediate destinations. To address these problems, the present disclosure discloses methods and systems that provide direct access of a scanned document onto a personal device of a user. The methods and systems use QR code technology to pair a multi-function device and the personal device of the user to directly transfer the scanned document from the multi-function device to the personal device of the user. In detail, a user scans a document using the multi-function device and once the scanned document is generated, the user is shown with an on-the-fly generated unique code (such as QR code) corresponding to the scanned document on the multi-function device. The user uses his personal device to scan that code, which automatically downloads the scanned document on his personal device. The user can share the same code with other users who can also scan the code to auto-download the scanned document on their respective personal devices. More details will be discussed below in conjunction with FIGS. 1-4.

Exemplary Environment

FIG. 1 shows an exemplary environment 100 in which various embodiments of the disclosure can be practiced. The environment 100 includes a multi-function device 102 and a personal device 104 of a user. The multi-function device 102 may be communicatively coupled to the personal device 104 of the user. In place of the multi-function device 102, the environment 100 may include a scanner, a multi-function peripheral device or any device with scanning functionalities. A user uses the multi-function device 102 for various tasks such as scanning, printing, copying, imaging or the like. The multi-function device 102 scans a document. In context of the present disclosure, the multi-function device 102 generates a pre-defined code such as QR code 103 corresponding to the scanned document. While the user uses the personal device 104 for his day-to-day tasks such as messaging, calling, communication, emailing, or the like. In context of the present disclosure, the personal device 104 scans the pre-defined code generated by the multi-function device 102 and automatically downloads the scanned document on the personal device 104. Various examples of the personal device 104 may include a mobile device, a personal digital assistant (PDA), or any personal device having camera with its built-in feature of scanning a pre-defined code such as QR code 103. Alternatively, as shown, the personal device 104 may have a camera 105 and a code reader app/application 106 to scan/read the pre-defined code successfully. For example, the code reader application 106 may be a QR code reader application, a bar code reader application or the like. For simplicity, the disclosure will be discussed with QR code as an example, but it is understood that the disclosure is applicable to all other types of pre-defined codes as known or later developed codes.

In context of the present disclosure, the multi-function device 102 scans a document and generates a QR code such as QR code 103 corresponding to the scanned document. The multi-function device 102 uses the QR code 103 to pair the multi-function device 102 and the personal device 104 of the user. Upon successful pairing, the multi-function device 102 directly and automatically transfers the scanned document to the personal device 104 of the user. Here, the multi-function device 102 sends the QR code 103 to the personal device 104 of the user, where the QR Code 103 includes an auto download link. The user can scan the QR code 103 using a camera with its built-in feature to scan the code 103 or may scan the QR code 103 using a QR code reader app 106. For example, as shown in FIG. 1, the user scans the QR code 103 using a QR code reader application 106 running on his personal device 104 and the information deciphered from the QR code 103 provides a download link which triggers automatic downloading of the scanned document onto the personal device 104 of the user. In this manner, the user can directly have the scanned document on his personal device 104 without needing any intermediate destination or without the need of manually downloading the scanned document from email/USB or other locations.

Exemplary System

Figure 2:
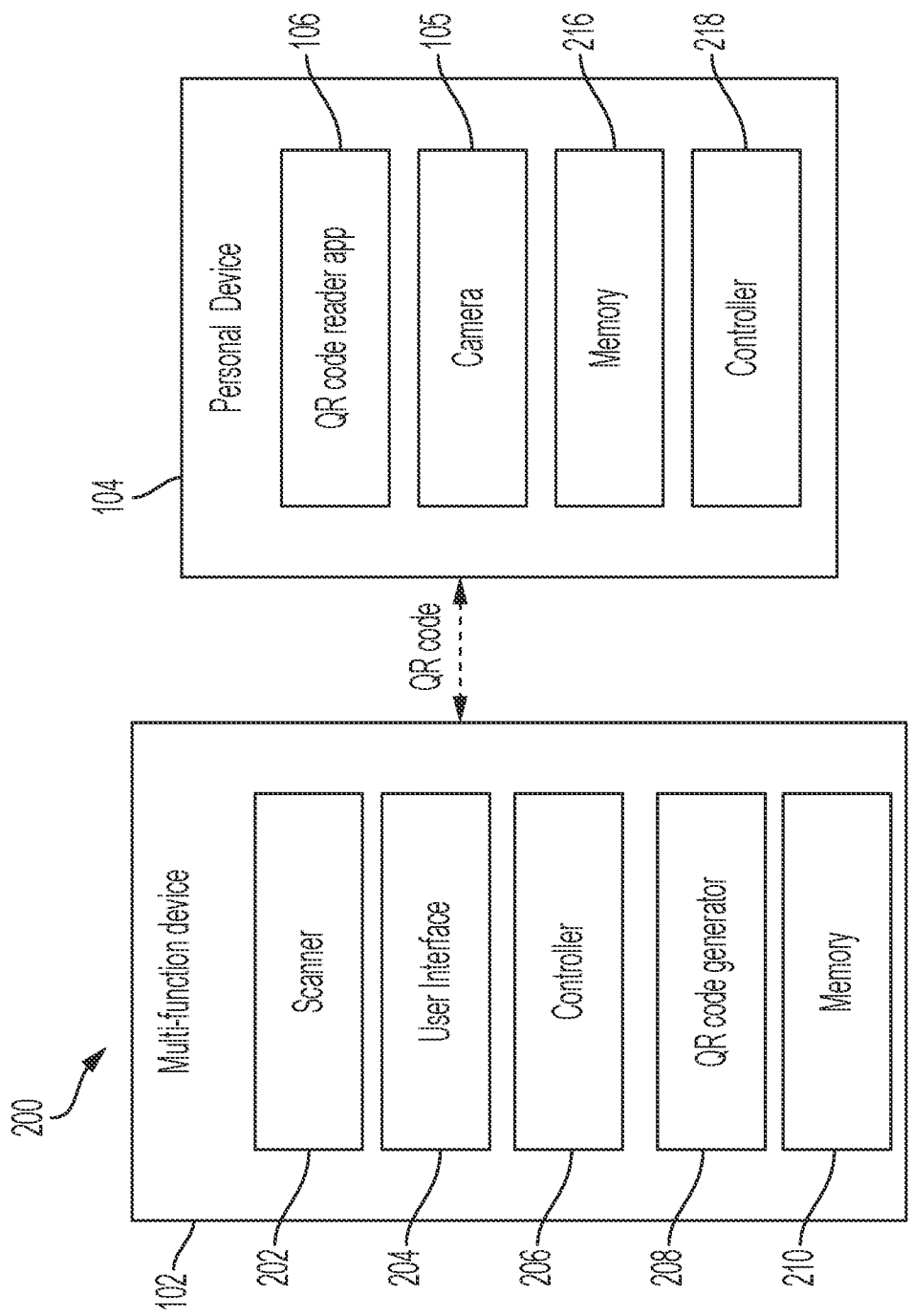
FIG. 2 is a block diagram illustrating various components of a system, in accordance with an embodiment of the present disclosure.

FIG. 2 is a block diagram illustrating various components of a system 200 including a multi-function device 102 and a personal device 104. As shown, the multi-function device 102 includes a scanner 202, a user interface 204, a controller 206, a code generator 208 such as a QR code generator 208 and a memory 210. The personal device 104 includes a code reader app 106 such as QR code reader app 106, a camera 105, a memory 216 and a controller 218. Each of the components 202-210 is connected to each other via a conventional bus or a later developed protocol. Similarly, each component 105-106, 216-218 of the personal device 104 is connected to each other via a conventional bus or a later developed protocol. Further, the components 202-210 and 105-106, 216-218 communicates with each other for implementing the current disclosure.

To begin with, a user places a document for scanning on a platen (although not shown) of the multi-function device 102. The multi-function device 102 receives the document for scanning. The controller 206 triggers the scanner 202 to initiate scanning. The scanner 202 scans the document to generate a scanned document, where the scanned document is generated in any pre-defined format such as PDF, JPG, or other desirable formats as known or later developed formats. The scanner 202 communicates with the controller 206 upon completion of the scanning.

Upon successful scanning, the controller 206 further triggers the QR code generator 208 to generate a QR code corresponding to the scanned document. The QR code generator 208 first stores the scanned document at a particular location such as a cloud server, a memory 210 of the multi-function device 102, and so on. The QR code generator 208 then generates a link including the location to access the scanned document. The QR code generator 208 communicates and sends the QR code generated corresponding to the scanned document to the controller 206. Thereafter, the controller 206 displays the generated QR code to the user via the user interface 204 of the multi-function device 102 for further processing by the user.

The user accesses his personal device such as device 104 for scanning the QR code displayed on the user interface 204 of the multi-function device 102. The user accesses/opens the QR code reader app 106 on his personal device 104 to scan the displayed QR code. Here, the QR code reader app 106 automatically accesses the camera 105 of the personal device 104 to scan the displayed QR code. The personal device 104 sends a request to scan the displayed QR code to the multi-function device 102 which is then received by the controller 206 of the multi-function device 102. Along with the request to scan the pre-defined code, identity of the personal device 104 such as phone number associated with the personal device 104 is sent to the multi-function device 102 or the controller 206 of the multi-function device 102.

Upon receiving the request to scan the QR code, the controller 206 pairs the multi-function device 102 and the personal device 104 using the QR code. In detail, the controller 206 receives the request along with the phone number of the user. Before providing access to the scanned document, the controller 206 authorizes the user using one or more methods. For example, the controller 206 checks if the received phone number matches with the registered phone number as stored in the memory 210 of the multi-function device 102. Upon successful matching, the controller 206 considers the QR code scanning as complete and pairs the multi-function device 102 and the personal device 104 of the user.

In other examples, the controller 206 may authorize the user based on his credentials due to various reasons. For example, the user may not have his personal device such as 104 registered with the multi-function device 102. In another example, the user may wish to receive the scanned document on a separate device (other than registered device 104) such as PDA, tablet, or the like. In such cases, the controller 206 authorizes the user using his credentials instead of the phone number. Here, the user is presented with a user interface such as user interface 204 to input his credentials. The credentials may be username, password, passcode, domain name, secret code, employee id, employee code or a combination thereof. The controller 206 matches the received credentials with the credentials stored in the memory 210 of the multi-function device 102. If the credentials input by the user matches with the credentials as stored, matching is considered successfully. As a result, the multi-function device 102 pairs the multi-function device 102 and the personal device 104 successfully using the QR code. This ensures that the user is authorized to receive the scanned document.

The controller 206 then automatically and directly transfers the scanned document to the personal device 104 of the user. The scanned document is transferred from the multi-function device 102 to the personal device 104 in the form of QR code. Here, transferring the scanned document includes transferring the QR code generated corresponding to the scanned document to the personal device 104 of the user, where the QR code includes information to access the scanned document. The information includes an auto-download link which triggers the download of the scanned document on the personal device 104 of the user. The auto-download link includes a link of a location where the scanned document is stored. This way the multi-function device 102 automatically transfers the scanned document to the personal device 104 of the user.

Further, the user interface 204 displays various messages and instructions to the user. The messages may relate to successfully scanning of the QR code, unsuccessful scanning and so on. The instructions may be, for example, "please put your camera in front of QR code for appropriate scanning". The user interface 204 may be used to provide any inputs such as credentials, email address, or other details to implement the present disclosure. The memory 210 stores all relevant details such as user details, credentials, phone numbers or other details relevant for implementing the current disclosure.

Continuing with the implementation, the personal device 104 receives the scanned document in the form of the QR code from the multi-function device 102. Upon receiving the QR code corresponding to the scanned document, the controller 218 launches the QR code reader app 106 on the personal device 104 of the user. The QR code reader app 106 then automatically accesses the camera 105 of the personal device 104 to scan the received QR code. The QR code reader app 106 (or the controller 218) deciphers/reads the QR code and retrieves the download link and passes the retrieved link to the controller 218. The controller 218 further automatically accesses the link to retrieve the scanned document from the link and automatically stores the scanned document in the personal device 104 of the user. For example, the scanned document may be stored in the memory 216 of the personal device 104. This way, the personal device 104 automatically downloads the scanned document. This way, the user gets the scanned document directly and immediately in his personal device 104, after scanning, without needing the user to manually download the scanned document from his email, or any other intermediate destinations such as USB, computing device, etc.

Although the personal device 104 is shown to include the QR code reader app 106 and the camera 105. But the personal device may include a camera with its built-in feature to scan/read/decipher the QR code. The QR code generated corresponding to the scanned document may be unique and may be generated based on content of the scanned document, user details, or a combination thereof.

In some implementations, the multi-function device 102 sends the QR code generated corresponding to the scanned document to the user. The user then scans the received QR code using his personal device 104 to automatically download the scanned document on his device 104 as discussed above in detail.

In some implementations, the multi-function device 102 provides an option to the user to share the displayed the QR code with one or more other users via a user interface 204. The user may select the displayed option if he wishes to share or send the displayed QR code with other users. Based on the user's selection, the multi-function device 102 requests the user to provide details of the one or more other users via the user interface 204. The user provides details of the one or more other users with whom he wishes to share the scanned document through the user interface 204. The details may be username, employee id, employee code, email address or the like. Upon receiving, the multi-function device 102 sends the QR code to the one or more other users via email, text message, and so on. To obtain the scanned document, the one or more other users then scan the received QR code using their respective personal devices. Scanning the QR code using respective personal devices of the one or more other users trigger automatic downloading of the scanned document onto respective personal devices of the one or more other users. The personal devices of the one or more other users may have a camera with its inbuilt feature to scan the QR code to obtain the scanned document or may have QR code reader app that automatically accesses the camera of their devices to obtain the scanned document. The personal devices of the one or more other users may be similar to the personal device 104 of the user to implement the current disclosure.

Figure 3A:
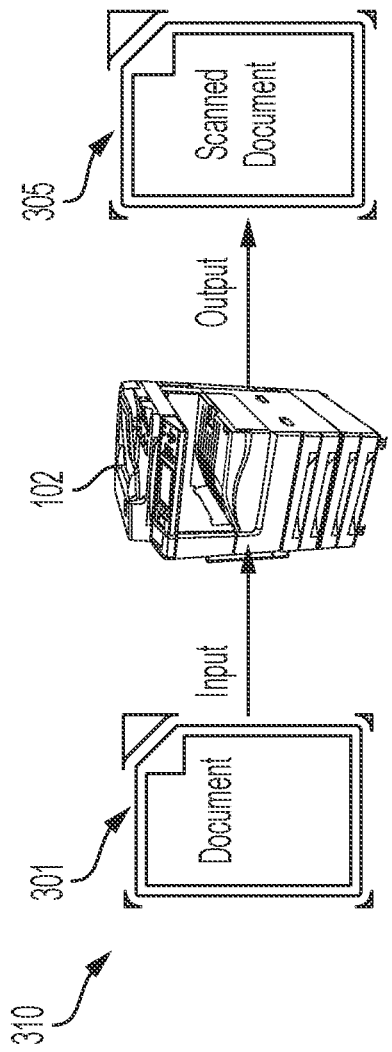
FIGS. 3A, 3B and 3C show various screenshots according to exemplary embodiments of the disclosure.
Figure 3C:
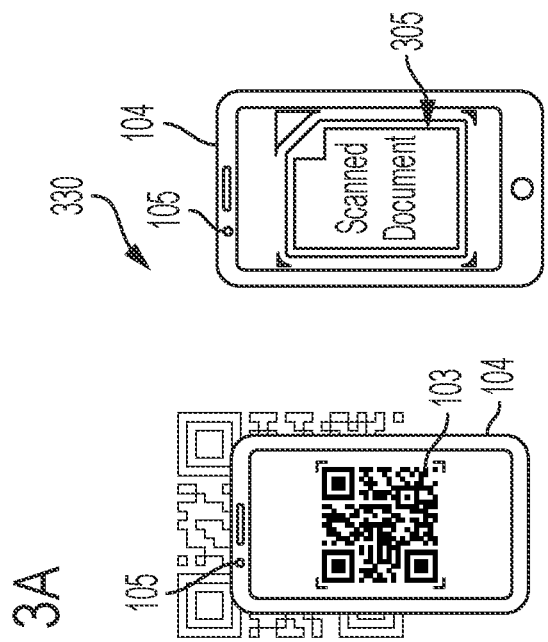
Figure 3B:
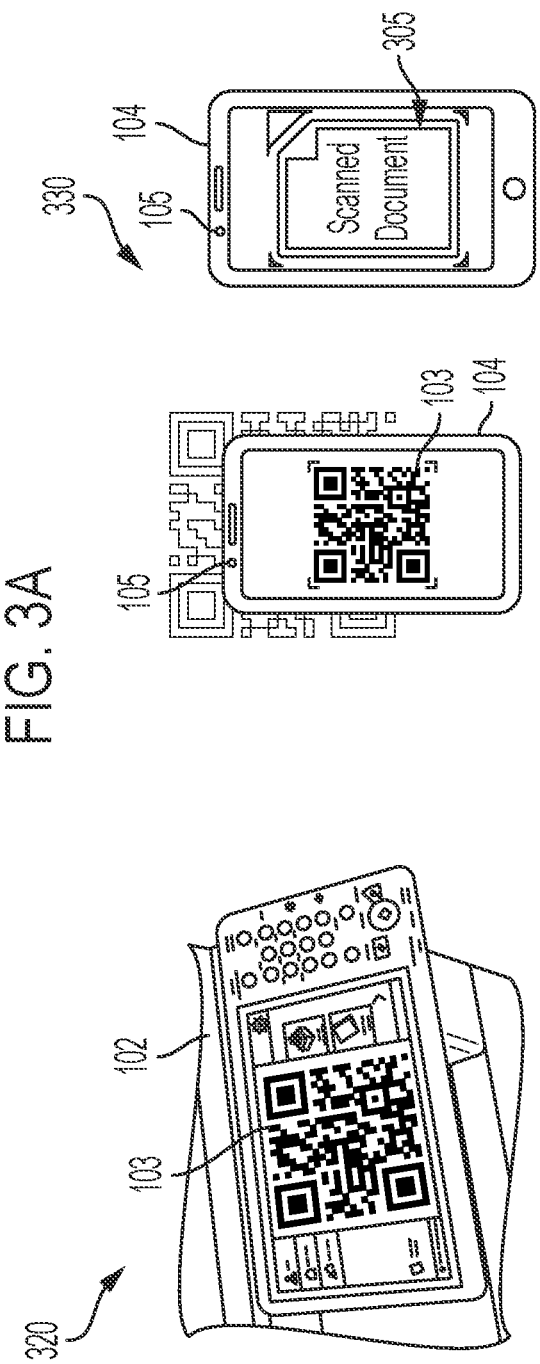

FIGS. 3A-3C show exemplary snapshots (310, 320, 330 respectively) of a process flow of how a scanned document such as 305 is automatically downloaded on a personal device of the user such as personal device 104. As per FIG. 3A, the multi-function device 102 receives a document 301 as an input for scanning and generates a scanned document 305 as an output. Once successfully generated, a QR code such as QR code 103 corresponding to the scanned document 305 is generated by the multi-function device 102 as shown in FIG. 3B. Further, as per FIG. 3B, the multi-function device 102 displays the generated QR code 103 to the user via a user interface such as the user interface 204 of the multi-function device 102. Subsequently as shown in FIG. 3C, the user uses his personal device 104 to scan the displayed QR code 103, which automatically downloads the scanned document 305 on the personal device 104 of the user.

Exemplary Flowchart

FIG. 4 is a method flowchart 400 for direct transferring and downloading of a scanned document from a multi-function device to a personal device of a user such as a mobile device, a personal digital assistant (PDA), a laptop, or the like. The scanned document is just one example, but the disclosure can be implemented for any media type that can be directly downloaded on the personal device of the user using QR code. For a person skilled in the art, it is understood that the disclosure can be implemented for other types of 2-dimensional (2D) codes such as bar codes etc. The method 400 facilitates direct downloading of the scanned document such that no physical connection is required between the multi-function device such as 102 and the personal device such as 104 and no intermediate destination is to be accessed by the user to download the scanned document. For example, the user does not require to manually download the scanned document from any intermediate destination such as an email, a cloud sever, a local server, a USB, or any other destination where the scanned document is generally placed. The method 400 further facilitates a faster and an efficient approach for the user to download the scanned document directly from the multi-function device without putting much effort. The method 400 is implemented at a multi-function device. But the method can be implemented at a scanner or any device with scanning and QR code generation functionalities. The method 400 requires pairing of the multi-function device with the personal device using a QR code after the document scanning is completed successfully.

The method 400 begins with when a user wishes to scan a document. The document may be any document such as a book, a booklet, a magazine, a form, a question paper, etc. The document may have one or more pages and may further include text, image, graphs, graphics, or a combination thereof. The user accesses the multi-function device and submits the document to the multi-function device for scanning. Upon receiving the document, scanning is initiated, and the document is scanned to generate a scanned document at 402. The scanned document may be of any format such as PDF, TIFF, JPG, PNG, MULTI TIFF, MULTI JPG, MULTI PNG etc. Upon completion of the scanning, a QR code is generated corresponding to the scanned document at 404. Several methods as known or later developed technologies may be used to generate QR code. For example, open source libraries such as zxing available in different technologies like Java, .NET, JavaScript etc. to generate QR code may be implemented. Here, generating the QR code corresponding to the scanned document includes storing the scanned document at a location such as a cloud location, local memory of the multi-function device and so on. Then, a link is generated to access the scanned document stored at the location. Further, the link is encrypted into a 2-dimensional code such as QR code. This way, the QR code corresponding to the scanned document is generated.

The generated QR code is then displayed to the user via a user interface of the multi-function device, at 406. The user scans the displayed QR code using his personal device. When the user scans the displayed QR code, a request to scan the displayed QR code is sent from the personal device, which is received by the multi-function device at 408. Upon receiving the QR code scan request, the method 400 includes authorizing the user before providing access to the scanned document. The user can be authorized based on phone number. For example, when the user sends a request to scan the displayed QR code via his personal device, his phone number associated with the personal device is also sent. The phone number received is matched with the user registered phone number as stored. If matches, the method 400 proceeds further. Else, the method 400 stops or may provide other ways of authorizing the user. For example, the user may be authorized based on one or more credentials such as username, password, employee id, employee code, domain name, fingerprint or a combination thereof. In such implementations, a user interface is presented to the user to input requested details, such as username and password. Then, the input details are matched with the username and password as stored with the multi-function device. The user is considered authorized when the details input by the user matches with stored details. The method 400 proceeds further when the user is authorized.

Once the user is authorized, automatic pairing takes place between the multi-function device and the personal device using the scanned QR code. Upon successful pairing, the scanned document is automatically transferred from the multi-function device to the personal device that can be directly downloaded on the personal device of the user at 410. Here, transferring the scanned document includes transferring the QR code corresponding to the scanned document to the personal device of the user. The QR code includes an auto-download link which when accessed by the personal device triggers the automatic download of the scanned document on the personal device of the user. The scanned document may be downloaded in a local memory of the personal device. In detail, the personal device itself downloads the scanned document using the link read from the QR Code. When the QR Code is scanned, the information is deciphered from the link that points to the scanned document that is hosted on the server.

For example, if the document is documentA.pdf, then the link may be <a href="https://server.com/scanned/documentA.pdf"></a> which triggers the auto download of the scanned document. This way the user can have direct access to the scanned document on his personal device without the need to first transfer the scanned document to an intermediate location such as email, local server, cloud server, USB etc., and without the need of manually downloading the scanned document on his device.

In some cases, the pre-defined code may be sent to the user, for example, via email, text message, and so on. In such cases, the user may access the pre-defined code using his computing device and then uses his personal device such as mobile device 104 to scan the pre-defined code displayed on the computing device. Upon successful scanning, the personal device automatically downloads the scanned document to the personal device by accessing a link included in the pre-defined code as discussed above in detail.

In some implementations, the QR code may be shared with one or more other users. The user can share the QR code with the one or more other users directly through the multi-function device. As an example, the user may submit details of the one or more other users with whom he wishes to share the QR code generated corresponding to the scanned document. In such cases, the multi-function device shares the QR code with the one or more other users. Upon receiving the QR code, the one or more other users can scan the received QR code using their respective personal devices and can have the scanned document directly downloaded on their personal devices. For example, the one or more other users can open their emails on their respective personal computers or laptops, scan the QR code present using their personal devices or QR code scanner to fetch the scanned document directly on their personal devices.

The method 400 can be implemented in the form of a non-transitory computer-readable medium including instructions executable by a processing resource to: receive a document for scanning from a user; scan the received document to generate a scanned document; upon completion of the scanning, generate a quick response (QR) code corresponding to the scanned document; display the QR code on a user interface of the multi-function device; receive a request to scan the displayed QR code via the personal device of the user; and upon successful scanning, automatically transferring the scanned document in the personal device of the user when the QR code is scanned successfully.

The present disclosure facilitates methods and systems for automatically and direct downloading of scanned documents onto a personal device of a user and thereby saving a huge manual effort. The methods and systems do not require the scanned document to be first placed in an intermediate location which is then manually accessed by the user to manually download the scanned document. In other words, the methods and systems avoid all effort to manually access and then manually download the scanned document on his device. The methods and systems provide an easier, convenient, and efficient way to get the scanned document without putting too much effort. The methods and systems allow downloading of the scanned document after successful scanning and proper authorization of the user, thereby offering a secure way of getting the scanned document on his device. The methods and systems further provide the facility to securely retrieve the scanned document outside of the multi-function device without physical pairing up or opening a session. The methods and systems further allow the user to share/forward the generated QR code to other users (for instance, via email), who in turn can scan the QR code to get the scanned document after due authentication. The methods and systems send the scanned document in the form of a QR code, and thus, providing a lightweight approach. The methods and systems work even when in case network issues arise. The methods and systems do not involve sharing of the actual scanned document instead shares the QR code corresponding to the scanned document and thus, offer enhanced security.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, generating, transferring, downloading, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for direct and automatic transferring of a scanned document from a multi-function device to a personal device, the method comprising:
at the multi-function device:
receiving a document for scanning;
scanning the received document to generate a scanned document;
in response to completion of the scanning, generating a pre-defined code corresponding to the scanned document, wherein the predefined code comprises an auto-download link causing automatic download of the scanned document;
displaying the pre-defined code on a user interface of the multi-function device;
receiving a request to scan the displayed pre-defined code via the personal device;
in response to receiving the request, authorizing the personal device to scan the displayed pre-defined code by matching a user credential with one or more credentials stored in a memory;
in response to matching of the user credential with the one or more credentials stored in the memory, pairing the multi-function device with the personal device;
in response to pairing of the multi-function device with the personal device, automatically transferring the scanned document to the personal device without requiring the personal device to access and download the scanned document from any intermediate destination, wherein automatically transferring the scanned document to the personal device comprises automatically transferring the pre-defined code from the multi-function device to the personal device; and
displaying, on the user interface of the multi-function device, an option to share the pre-defined code with one or more other personal devices.

2. The method of claim 1, wherein the pre-defined code comprises a link to a location where the scanned document is stored.

3. The method of claim 1, further comprising, at the multi-function device, sharing the pre-defined code with the one or more other personal devices based on an input received via the displayed option on the user interface.

4. The method of claim 3, further comprising, automatically downloading the scanned document to the one or more other personal devices in response to sharing of the pre-defined code with the one or more other personal devices.

5. The method of claim 1, further comprising, sending the pre-defined code to the personal device.

6. A multi-function device for direct transferring a scanned document to a personal device, the multi-function device comprising:
a scanner configured to scan a document received for scanning and to generate a scanned document corresponding to the document received for scanning;
a code generator configured to generate a pre-defined code corresponding to the scanned document, wherein the predefined code comprises an auto-download link causing automatic download of the scanned document;
a user interface configured to:
display the pre-defined code; and
display an option to share the pre-defined code with one or more other users; and
a controller configured to:
receive a request to scan the displayed pre-defined code via the personal device;
in response to receiving the request, authorize the personal device to scan the displayed pre-defined code by matching a user credential with one or more credentials stored in a memory;
in response to matching of the user credential with the one or more credentials stored in the memory, pair the multi-function device with the personal device; and
upon pairing of the multi-function device with the personal device, automatically transfer transferring the scanned document to the personal device without requiring the personal device to access and download the scanned document from any intermediate destination, wherein automatically transferring the scanned document to the personal device comprises automatically transferring the pre-defined code from the multi-function device to the personal device.

7. The multi-function device of claim 6, wherein the pre-defined code comprises a link to a location where the scanned document is stored.

8. The multi-function device of claim 6, wherein the controller is configured to share the pre-defined code with one or more other personal devices based on an input received via the displayed option on the user interface.

9. The multi-function device of claim 8, wherein the personal devices are configured to automatically download the scanned document in response to receipt of the pre-defined code via the one or more other personal devices.

10. A system, comprising:
a multi-function device having one or more components configured to:
receive a document for scanning from a user;
scan the received document and generate a scanned document;
in response to completion of the scanning, generate a pre-defined code corresponding to the scanned document, wherein the predefined code comprises an auto-download link causing automatic download of the scanned document;
display the pre-defined code on a user interface of the multi-function device;
receive a request to scan the displayed pre-defined code via a personal device;
in response to receiving the request, authorizing the personal device to scan the displayed pre-defined code by matching a user credential with one or more credentials stored in a memory;
in response to matching of the user credential with the one or more credentials stored in the memory, pair the multi-function device with the personal device;
in response to pairing of the multi-function device with the personal device, automatically transfer the scanned document to the personal device without requiring the personal device to access and download the scanned document from any intermediate destination, wherein automatically transferring the scanned document to the personal device comprises automatically transferring the pre-defined code from the multi-function device to the personal device; and display, on the user interface of the multi-function device, an option to share the pre-defined code with one or more other personal devices; and a personal device communicatively coupled to the multi-function device using the pre-defined code, the personal device having one or more components configured to:

send the request to scan the pre-defined code displayed on the user interface of the multi-function device; and in response to scanning of the pre-defined code, automatically download the scanned document on the personal device.

\* \* \* \* \*